United States Patent [19]

Lötscher

[11] 4,211,296
[45] Jul. 8, 1980

[54] SCALE

[76] Inventor: Bernhard Lötscher, Mühlebergstrasse 88, 8450 Andelfingen, Switzerland

[21] Appl. No.: 24,861

[22] PCT Filed: Aug. 4, 1978

[86] PCT No.: PCT/CH78/00011
§ 371 Date: Apr. 5, 1979
§ 102(e) Date: Mar. 12, 1979

[87] PCT Pub. No.: WO79/00136
PCT Pub. Date: Mar. 22, 1979

[30] Foreign Application Priority Data

Aug. 5, 1977 [CH] Switzerland ............... 9626/77

[51] Int. Cl.² ............................................. G01G 3/14
[52] U.S. Cl. ............................. 177/211; 177/DIG. 9
[58] Field of Search ............. 177/210 R, 211, DIG. 9

[56] References Cited

U.S. PATENT DOCUMENTS

| | | | |
|---|---|---|---|
| 3,556,237 | 1/1971 | Allison | 177/211 X |
| 3,918,539 | 11/1975 | Wise | 177/210 R |
| 4,067,408 | 1/1978 | Dodds et al. | 177/DIG. 9 |
| 4,082,154 | 4/1978 | Pillote | 177/211 |

*Primary Examiner*—George H. Miller, Jr.
*Attorney, Agent, or Firm*—Werner W. Kleeman

[57] ABSTRACT

A scale, which is particularly intended for weighing humans, comprises a pedestal and a table. The pedestal is provided with upwardly extending and the table with downwardly extending holders, which are arranged at the region of the table edge and essentially uniformly distributed over the table circumference. In each case there alternately follows a holder at the pedestal a holder of the table. The holders are provided at their free ends with a notch which forms a holding location for an electrical conductor. The conductor consists of an electrically elongatable wire and extends in a zig-zag configuration from one holder to the other. Both ends of the conductor are connected with an electronic measuring unit, which contains means for detecting the electrical resistance of the conductor. The conductor thus carries the table and at the same time serves as a measuring transducer, in order to convert the weight load of the table into an electrical signal.

8 Claims, 4 Drawing Figures

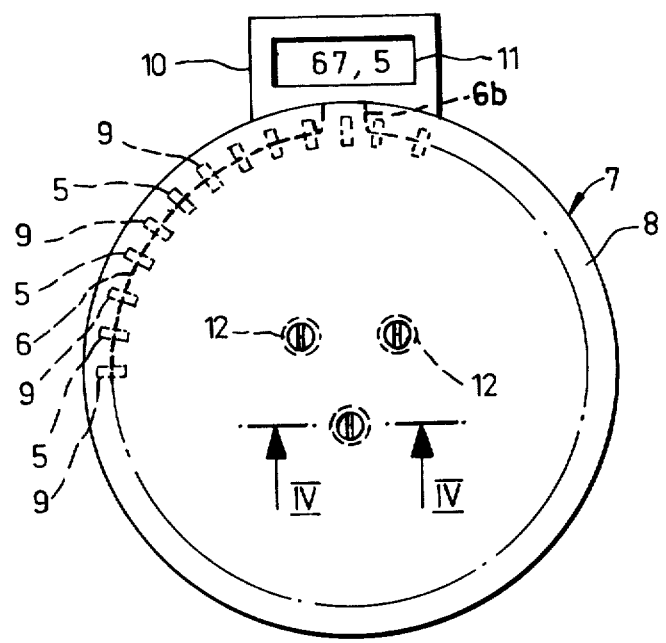
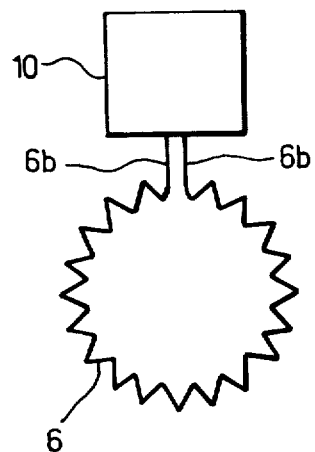
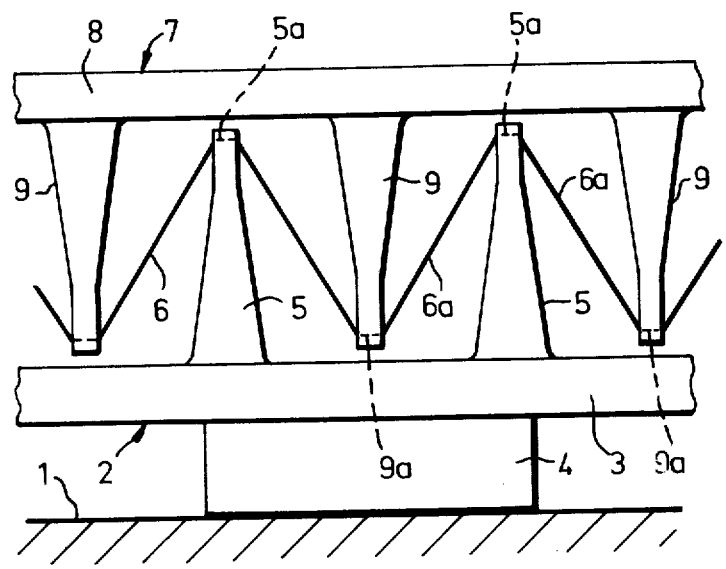
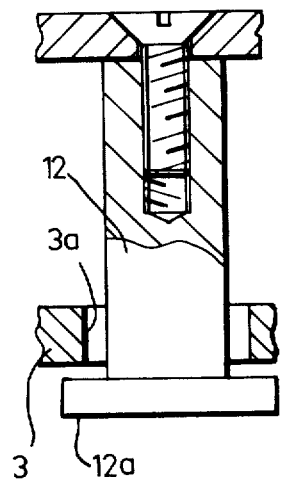
Fig. 1
Fig. 2
Fig. 3
Fig. 4

SCALE

BACKGROUND OF THE INVENTION

The present invention relates to a scale, especially for weighing individuals, comprising a pedestal, a moveably retained table and at least one measuring element possessing an electrical conductor, wherein the table is operatively connected with the conductor, in order to elongate the same as a function of the weight which loads the table and to alter its electrical resistance.

There are known to the art scales wherein the table is operatively connected with one or two resistance strain gauges serving as measuring elements. Such resistance strain gauges usually contain a deformable strip-like carrier. Arranged on this carrier is an electrically conductive wire which approximately forms a single-layer winding or can extend in a zig-zag configuration. In each case the wire is arranged in such a way that it is elongated upon elongation of the resistance strain gauge, and thus, alters its electrical resistance. This resistance change can be detected by means of a suitable circuit and employed for determining weight.

With each of these heretofore known scales there are provided, in addition to the resistance strain gauges, mechanical guide elements which moveably connect the table with the pedestal and guide such that it can be vertically displaced. Furthermore, there is provided at least one restoring spring which loads the table with an upwardly directed force. In order that there is possible a more or less exact weight measurement by means of the resistance strain gauges, the mechanical guide elements must provide a guide which is practically free of play in order to prevent, on the one hand, horizontal displacements, and on the other hand, must render possible a vertical movement of the table which is as free as possible of friction. These requirements can only be rendered compatible with one another with difficulty and necessitate a relatively expensive construction.

SUMMARY OF THE INVENTION

The invention is thus concerned with the objective of providing a scale which renders possible generating an electrical signal dependent upon weight and having good accuracy and nonetheless can be fabricated at favorable cost.

This objective is obtained by means of a scale of the previously mentioned type which is characterized, according to the invention, by a pedestal, a movably retained table and at least one measuring element possessing an electrical conductor, wherein the table is operatively connected with the conductor, in order to elongate such as a function of the weight loading of the table and to alter its electrical resistance. Importantly, the pedestal and the table possess a number of holders, which hold the conductor at holding locations which are arranged at the region of the edge of the table, and generally in each case a holder of the table follows a holder of the pedestal. The holding locations are electrically insulated with respect to one another and the holding locations of the holders of the pedestal are located above the holding locations of the other holder so that each conductor extends in a zig-zag from one holder to the next and at the same time serves as the measuring element and for supporting the table.

The holder should retain the conductor at holding locations which are arranged at the region of the table edge, so that the conductor extends approximately along the table edge or at least along a section of the table edge. Under the expression "at the region" there is meant that the conductor should be retained in such a manner that the center of gravity of the body or masses, for the weighing of which there is intended the scale, should be located, during weighing, within a closed path defined in plan view by the holding locations. This requirement generally is then fulfilled when the holding locations, in plan view, never are located more than about 10% of the spacing of oppositely situated edged sections of the table within the edge section situated closest thereto. In the case of a scale for weighing humans, where the spacing of oppositely situated edge sections, i.e., in the case of a circular table whose diameter amounts to about 30 to 50 centimeters, the holding locations at most must be situated 3 to 5 centimeters within the edge section neighboring such holding locations.

According to an advantageous construction of the invention there is provided only a single conductor, which, apart from a short interruption between the conductor ends, in plan view forms a closed path. The holding locations follow one another in succession with the same spacing, apart from a possible exception at the conductor end. The interruption of the path between the conductor ends should amount to at most 10% of the length of the total path.

With the inventive scale each of the electrical conductors, serving as a measuring element, simultaneously serves to support, guide and return the table. Therefore, there are not necessary any additional guide elements for producing an exact guiding of the table and no additional return springs. Thus, the scale can be fabricated at relatively low costs and nonetheless possesses great accuracy.

However, it is of course also possible to provide additional safety means which prevent that the table, during transport of the scale or upon application of forces horizontally thereat, will be excessively shifted out of its predetermined position. However, such safety means, in contrast to the guide elements of the heretofore known balances, need not be effective during the normal weighing operations and therefore can exhibit a large amount of play and can be fabricated at low cost.

The inventive scale is particularly suitable for use as a scale for weighing humans.

BRIEF DESCRIPTION OF THE DRAWINGS

The subject matter of the invention will now be explained based upon an exemplary embodiment illustrated in the drawing. In the drawing there are shown:

FIG. 1 is a top plan view of a scale,

FIG. 2 a schematic illustration of the electrical conductor serving as measuring element, FIG. 3 a developed side view of the scale on an enlarged scale, and FIG. 4 a section along the line IV—IV of FIG. 1 on the same scale as in FIG. 3.

DETAILED DESCRIPTION OF THE PREFERRED EMBODIMENTS

The human-scale illustrated in FIGS. 1 to 4 comprises a pedestal 2 standing upon the floor 1. This pedestal 2 comprises an essentially circular plate 3 having for instance three feet 4 divided over its circumference. The pedestal 2 furthermore possesses at the upper side of the plate 3 a number of, namely at least ten and for instance approximately twenty upwardly extending plug-like holders 5 which are uniformly distributed at a horizontal pitch circle. The holders 5 are provided at their upper free ends with a notch, extending tangentially with respect to the pitch circle, forming a holding location 5a for an electrical conductor 6. The scale furthermore possesses a table 7 having a circular plate 8 which is provided at its lower side, at the region of its edge, with plug-like, downwardly protruding holders 9. The holders 9 are likewise distributed at a pitch circle which is coaxial with respect to the table edge and coaxial and of the same diameter as that pitch circle at which there are arranged the holders 5. Moreover, the holders 9 are provided at their lower, free ends with a notch which is tangential with respect to the afore-mentioned pitch circle, constituting a holding location 9a for the conductor 6. Each holder 9 is located at the center between two neighboring holders 5. The ends 6b of the conductor 9 are connected with the terminals of an electrical measuring unit 10. Both ends 6b of the conductor 6 can each be guided over a holder 5 of the pedestal to the measuring unit 10. Furthermore, there can be provided at the pedestal additional clamps or other attachment means at which there are secured so as to be tension-proof the ends 6b of the conductor 6. Since the table is not supported between the holders 5 supporting both conductor ends 6b, it is not absolutely necessary to provide a holder 9 between both of these holders 5. Therefore, with the exception of a possible empty location, at the conductor ends, there always follow one holder 9 after a holder 5. The holder loctions 5a and 9a, if there is not considered a possible empty place between the conductor ends 6b, are thus, in plan view, uniformly distributed along a circle. The holder locations 5a are thus all located in the same horizontal plane. Equally, the holder locations 9a are all located in the same horizontal plane. Moreover, the holder locations 5a are located above the holder locations 9a. The conductor 6 forms, in plan view, apart from an interruption between the conductor ends 6b, a closed path, i.e., a polygon. The interruption should amount to at most 10%, for instance, approximately 3 to 5%, of the length of the entire path. Viewed from the side, the conductor 6 extends in a zig-zag configuration from one holder to the next, and the conductor section 6a located at both sides of a holder 5 or 9 form an acute angle with vertical lines, i.e., an angle of at most 45 degrees, which for instance amounts to about 30 degrees. There is also provided a display element 11 which together with the measuring unit 10 can be accommodated in a housing attached to an edge of the plate 4 at the pedestal 2. Furthermore, there are provided three plugs 12 arranged within the polygon formed by the conductor 6 at the lower side of the plate 8 upon a pitch circle and fixedly threadably connected therewith, for instance by means of screws. The plugs 12 each can penetrate through a respective hole 3a of the plate 3 and are provided below such with a head 12a. Between the plug and the hole walls there is an intermediate space. The diameter of the heads 12a is larger than that of the holes 3a and between the heads 12 and the lower surface of the plate 3 there is likewise present an intermediate space. The plugs 12 and their heads 12a normally therefore do not contact the pedestal 2, and particularly when the table 7 is located in its rest position. The conductor 6 thus forms the only element which, in the rest position of the table, contacts both parts of the pedestal as well as also parts of the table. However, the plugs 12 limit horizontal displacement of the table 7 with respect to the pedestal 2 at a predetermined maximum value. Furthermore, they also limit upwardly occurring vertical displacements of the table to a predetermined maximum value. The plugs 12 thus form safety means, in order to prevent excessive displacements of the table. They particularly also prevent that the table 7, for instance during transport of the scale, separates from the pedestal 2.

The holders 5, 9 and/or the plates 3 or 8, respectively, consist of an electrically insulating plastic, so that all holding locations 5a, 9a are electrically insulated with respect to one another. The plates and holders can consist of, for instance, rigid-PVC. The plate 3, the feet 4 and the holders 5 can form a coherent, one-piece body. In the same manner also the plate 8 and the holders 9 can be formed by a coherent one-piece body.

The conductor 6 consists of an electrically expansible wire and fulfills different functions. Firstly, it supports and holds the table 7 upon the pedestal 2. Owing to its elasticity it does not render possible any vertical displacements of the table which are dependent upon the weight load of the table 7, and it also simultaneously functions as a restoring element which exerts an upwardly directed return force upon the table. When the table 7 is downwardly pushed, out of its rest position, due to the application of a weight which is reposing thereon, then such causes an elongation of the conductor 6 in its lengthwise direction. Consequently, the electrical resistance of the conductor 6 is increased. Thus, the conductor 6 also serves as a measuring element, with which there is operatively connected the table 7 and transforms the weight changes into resistance changes.

The electronic measuring unit 10 contains a current supply, i.e., a battery or a network component, and switch means in order to detect the resistance or resistance changes of the conductor 6. The measuring unit 10 furthermore contains elements, in order to produce an electrical signal which contains an indication of the weight loading the table. This signal is then delivered to the display element 11, so that such can indicate the weight. The signal and the display element can be constructed such that the display is accomplished digitally. Of course, an analog display is however also possible.

The measuring unit 10 contains as the active element semiconductors. During the measurement of the resistance of the conductor 6 the change of the quiescent current and threshold voltages of the semiconductor could cause a null point drift and thus measuring errors. The measuring unit 10 thus can have switching elements, in order to be able between the measurements of the resistance of the conductor 6, to detect periodically briefly the resistance value of a comparison resistance or a fixed reference voltage and thus to undertake a null point correction. In this way it is possible to extensively avoid measuring errors brought about by null point drift. Moreover, the measuring unit 10 also can contain a bridge circuit, whose one branch is formed by the conductor 6.

Since the conductor 6 simultaneously serves for supporting, guiding and resetting the table 7 as well as for converting load changes into resistance changes, it should possess different properties. It should be designed such that the tensile stresses which are formed therein at the maximum contemplated load of the table 7 are still below the elastic limit of the conductor material. On the other hand, it should however also be elongated by the load changes to be measured, in a manner such that there is formed as large as possible resistance change. These conditions can be for instance fulfilled in that the conductor cross-section is designed such that the elasticity limit of the conductor amounts to about the 1.5 to 3-fold of the tensile stress which arises in the conductor with the contemplated maximum load. In the case of a scale provided as a human-scale, it is possible to for instance dimension the conductor such that its elasticity limit corresponds to the tensile stress arising upon loading the table with 200 to 300 kg. In order to render possible an exact and simple resistance measurement, the conductor 6 furthermore should possess a relatively large resistance, and its resistance should be as independent as possible of temperature. The conductor 6 can be formed, for instance, by a wire having a solid cross-section, which is formed of chromium nickel, constantan or manganin. The diameter of the wire, in the case of a human-scale, depending upon the employed material, the number of provided holders and the angle which the conductor sections 6a extending in a zig-zag configuration form with the vertical line, can amount to for instance 0.1 to 0.2 millimeters.

During assembly of the scale the conductor 6 can be successively inserted into the notches of the holders 5 and 9 respectively. After it has been completely inserted, the conductor can be briefly heated by a current surge in such a manner that the plastic forming the holder 5, 9 is softened at the region of the notches 5a and 9a, respectively. In this way the conductor 6 can be slightly welded in the holders and thus can be fixed at the holders in a very simple manner.

The described scale can be simply fabricated and at relatively low cost and nonetheless possesses a great accuracy. It has particularly also the advantage that the measuring accuracy is only slightly affected by deviations of the pedestal and table from the horizontal position, as long as the positional deviations are not too extreme. Furthermore, forces which engage at the table parallel to the plane spanned by the table, practically have no effect upon the measurement, in the event that the forces are not too large.

Of course, the scale can be modified in a number of different ways. For instance, the table readily can also possess a different contour. Instead of having a round plate it could for instance possess an oval, square or hexagonal plate for the reception of the load. However, at the region of the edge of the plate the conductor should extend along the plate edge. In this way there is insured that the center of gravity of the person who is to be weighed or generally the object to be weighed or the mass to be weighed is located within the polygon formed in plan view by the holding locations. This in turn ensures that the conductor will only be loaded in tension over its entire length.

Furthermore, it would be possible to provide, instead of only a single conductor, two or more conductors serving as measuring elements, the ends of which in each case are connected with the measuring unit. These conductors then can again be arranged in such a manner that in plan view they collectively form a path which is closed apart from the short interruptions at the terminals, i.e., a polygon. Each interruption of the path at the terminal can amount to less than one-tenth of the polygon circumference.

However, it is not absolutely necessary that the conductor or the conductors form, in plan view, an approximately closed path. If the table possesses for instance a four-cornered plate, it would be possible to support the table only along two oppositely situated edge sections, i.e., along two oppositely situated sides. The holding locations of course also define in this case, in plan view a closed, and specifically four-cornered path wherein however there is not present at all sections of such path a conductor section.

Moreover, it is of course also possible to vary the construction of the holder. It would be possible to provide the holder for instance with throughpass holes, through which there can be drawn the conductor. Furthermore, there could be provided clamping elements, for instance screws, in order to fixedly clamp the conductor at the holders.

Moreover, the feet of the pedestal can be provided with adjustment screws in order to accommodate the pedestals to irregularities of the floor.

Finally, it is further remarked that it is possible to provide in addition to the display element or instead of such a printer which prints-out the measured weight.

While there are shown and described present preferred embodiments of the invention, it is to be distinctly understood that the invention is not limited thereto, but may be otherwise variously embodied and practiced within the scope of the following claims.

Accordingly, what is claimed is:

1. In a scale, especially for weighing humans, possessing a pedestal, a movably retained table and at least one measuring element possessing an electrical conductor, wherein the table is operatively connected with the conductor, in order to elongate the conductor as a function of the weight loading of the table and to alter its electrical resistance, the improvement which comprises:
   said pedestal possessing a number of holders, each of which holder defines a holding location for the conductor;
   said table possessing a number of holders, each of which holders defines a holding location for the conductor;
   said table having a table edge;
   said holders of both said pedestal and said table being located at the region of said table edge;
   said holders of the pedestal and table being arranged in alternating relationship, so that a holder of the table generally follows a holder of the pedestal;
   said holding locations being electrically insulated with respect to one another;
   said holding locations of the holders of the pedestal being located above the holding locations of the holders of the table, so that said at least one conductor extends in a substantially zig-zag configuration from one holder to the next holder and at the same time serves as both the measuring element and for supporting the table.

2. The improvement as defined in claim 1, wherein: said at least one electrical conductor constitutes a single conductor which carries said table.

3. The improvement as defined in claim 1, wherein: each said pedestal and said table possessing at least six of said holders.

4. The improvement as defined in claim 1, wherein: said at least one electrical conductor has sections extending in said substantially zig-zag configuration between said holders; and
   the sections of said conductor which extend in zig-zag configuration forming, together with intersecting vertical lines, an angle which does not exceed 45 degrees.

5. The improvement as defined in claim 1, wherein:
said at least one electrical conductor constitutes the only element which, in a rest position of the table, contacts both parts of the pedestal and parts of the table.

6. The improvement as defined in claim 1, wherein:
said at least one electrical conductor comprises a wire having a solid cross-section.

7. The improvement as defined in claim 1, wherein:
said holders are distributed over the circumference of the table;
said at least one conductor having conductor ends interrupted from one another; and
said at least one conductor, apart from said interruption at the conductor ends, forming a closed path in plan view.

8. The improvement as defined in claim 7, wherein:
said holding locations, viewed in plan view, are arranged upon a circle and, apart from the location of the conductor ends, are uniformly distributed thereat.

* * * * *